Patented Sept. 1, 1953

2,650,918

UNITED STATES PATENT OFFICE 2,650,918
PIPERAZINE ESTROGEN SALT AND
SEPARATION PROCEDURE

Desmond Beall, Westmount, Quebec, and Gordon A. Grant and Paul Emile Legault, Montreal, Quebec, Canada, assignors to Ayerst, McKenna & Harrison, Limited, Montee St. Laurent, Montreal, Quebec, Canada, a corporation of Canada No Drawing. Application April 10, 1952, Serial No. 281,684

9 Claims. (Cl. 260—239.5)

This invention relates to a new chemical compound, the 2:5 dimethyl piperazine salt of equilin 3-monosulfate, and to the process by which the new salt is prepared. It is also concerned with a new and improved method for separating equilin sulfate from mixtures in which it may be present along with other ketonic estrogen sulfates, such as estrone sulfate and equilenin sulfate, this method involving the formation of the novel salt, and its recovery from the estrogen mixture.

We have discovered that a new salt of equilin 3-monosulfate is formed when an alkali metal equilin 3-monosulfate, such as sodium equilin 3-monosulfate, and 2:5 dimethyl piperazine or its water-soluble salts are brought together in aqueous solution. If the pH of the reaction medium corresponds substantially to neutrality the new 2:5 dimethyl piperazine salt of equilin 3-monosulfate will be precipitated and can be recovered in crystalline form. Water soluble salts of 2:5 dimethyl piperazine which have given excellent results when the reaction is carried out at room temperature include the acetate, sulfate and hydrochloride. The new compound, the 2:5 dimethyl piperazine salt of equilin 3-monosulfate, crystallizes in substantially pure form from the cold aqueous reaction mixture.

Unlike the corresponding 2:5 dimethyl piperazine salts of other ketonic estrogenic sulfates, such as estrone sulfate and equilenin sulfate, we have found that 2:5 dimethyl piperazine di-equilin 3-monosulfate, while slightly soluble in cold water, is much more soluble in hot water than the corresponding salts of the other ketonic estrogen sulfates. It is therefore possible to crystallize the new salt from its aqueous solutions.

2:5 dimethyl piperazine di-equilin 3-monosulfate, the new salt, is moderately soluble in methanol, ethanol and acetone. It is substantially insoluble in ether and in hexane. It is nondeliquescent and stable on standing under ordinary atmospheric conditions for a considerable time.

The marked solubility of the 2:5 dimethyl piperazine salt of equilin 3-monosulfate in hot water as contrasted with the 2:5 dimethyl piperazine salts of the other ketonic estrogenic sulfates, estrone sulfate and equilenin sulfate, permits utilization of the new compound in the recovery of equilin sulfate from a mixture of ketonic estrogen sulfates. A mixture of alkali metal ketonic estrogen sulfates may be reacted in an aqueous reaction mixture with 2:5 dimethyl piperazine or its water-soluble salts. When the aqueous mixture is heated, as for example to the boiling point, only the 2:5 dimethyl piperazine salt of equilin 3-monosulfate goes into solution in any substantial amount. Upon cooling, crystals of 2:5 dimethyl piperazine di-equilin 3-monosulfate separate from the cooled reaction mixture. If desired, the 2:5 dimethyl piperazine salt may be removed and hydrolyzed to yield equilin. In this way the equilin constituent of the mixture of ketonic estrogens is readily separated from other constituents thereof, such as estrone and equilenin.

The following examples are given as illustrations of our invention in its preferred form, but details as given therein are not to be construed as limiting the scope thereof.

Example 1

To a solution of 2.5 grams of sodium equilin sulfate in 25 milliliters of water at room temperature there was added a solution of 3.0 grams of 2:5 dimethyl piperazine acetate dissolved in approximately the minimum amount of water necessary to bring it into solution. The reaction mixture was allowed to stand at 4° C. overnight and it was then centrifuged, the solid residue being extracted 5 times with 20 milliliters of boiling water. The small amount of insoluble material remaining was discarded.

On cooling the combined extracts, crystals of 2:5 dimethyl piperazine equilin sulfate were deposited. The yield was 70% of theory, and an elemental analysis gave results agreeing with the theoretical values for 2:5 dimethyl-piperazine di-equilin 3-monosulfate.

Example 2

A mixture of ketonic estrogens, of which $[\alpha]_D$ in ethanol was $+280°$, containing approximately 70% of equilin, was sulfated in the usual way. The resultant mixture of crude sodium salts was dissolved in 100 milliliters of water. To this solution there was added 7.0 grams of 2:5 dimethyl piperazine acetate dissolved in 20 milliliters of water. The mixture was allowed to stand at 4° C. overnight. It was then centrifuged and the solid residue extracted five times with 40 milliliters of boiling water. The extract was filtered while hot and, on cooling, it deposited crystals of 2:5 dimethyl piperazine di-equilin 3-monosulfate, which was recrystallized from hot water or methanol.

When a sample of the recrystallized 2:5 dimethyl piperazine salt of equilin 3-monosulfate was hydrolyzed with dioxane, equilin, $[\alpha]_D + 320°$ in ethanolic solution, was recovered and its identity established by its infra-red absorption spectrum. The equilin portion of the mixture of ketonic estrogens was thus separated and recovered.

We claim:

1. 2:5 dimethyl piperazine di-equilin 3-monosulfate.

2. The process of preparing 2:5 dimethyl piperazine di-equilin 3-monosulfate which comprises reacting an alkali metal equilin 3-monosulfate with a compound selected from the group consisting of 2:5 dimethyl piperazine and its water-soluble salts.

3. The process of preparing 2:5 dimethyl piperazine di-equilin 3-monosulfate which comprises bringing together an alkali metal equilin 3-monosulfate and a compound selected from the group consisting of 2:5 dimethyl piperazine and its water-soluble salts in an aqueous reaction medium, and recovering 2:5 dimethyl piperazine di-equilin 3-monosulfate therefrom.

4. The process of preparing 2:5 dimethyl piperazine di-equilin 3-monosulfate which comprises bringing together sodium equilin 3-monosulfate and a compound selected from the group consisting of 2:5 dimethyl piperazine and its water-soluble salts in an aqueous reaction medium.

5. The process which comprises bringing together sodium equilin 3-monosulfate and a compound selected from the group consisting of 2:5 dimethyl piperazine and its water-soluble salts in an aqueous reaction medium, and cooling the reaction mixture and recovering 2:5 dimethyl piperazine di-equilin 3-monosulfate in crystalline form therefrom.

6. The process which comprises bringing together sodium equilin 3-monosulfate and a compound selected from the group consisting of 2:5 dimethyl piperazine and its water-soluble salts in an aqueous reaction medium at a pH substantially corresponding to neutrality, and cooling said medium whereupon 2:5 dimethyl piperazine di-equilin 3-monosulfate is deposited therein.

7. The process of separating equilin as the 2:5 dimethyl piperazine di-equilin 3-monosulfate salt thereof from a mixture in which it is present in the form of an alkali metal equilin 3-monosulfate together with other alkali metal estrogen sulfates including sulfated estrone and sulfated equilenin, which comprises reacting said mixture with a compound selected from the group consisting of 2:5 dimethyl piperazine and its water-soluble salts, treating said reaction mixture with hot water, thereby preferentially dissolving the 2:5 dimethyl piperazine di-equilin 3-monosulfate present therein, and separating crystalline 2:5 dimethyl piperazine di-equilin 3-monosulfate from said aqueous solution.

8. The process of recovering equilin as the 2:5 dimethyl piperazine di-equilin 3-monosulfate salt thereof from a mixture in which it is present in the form of an alkali metal equilin 3-monosulfate along with other alkali metal estrogen sulfates including sulfated estrone and sulfated equilenin, which comprises reacting said mixture in an aqueous medium with a compound selected from the group consisting of 2:5 dimethyl piperazine and its water-soluble salts, heating said aqueous medium in order to preferentially dissolve the 2:5 dimethyl piperazine di-equilin 3-monosulfate present therein, cooling said reaction medium whereupon solid 2:5 dimethyl piperazine di-equilin 3-monosulfate is deposited therein, and separating crystalline 2:5 dimethyl piperazine di-equilin 3-monosulfate therefrom.

9. The process of recovering equilin from a mixture in which it is present in the form of sodium equilin 3-monosulfate along with other sodium estrogen sulfates including sulfated estrone and sulfated equilenin, which comprises bringing said mixture into contact in an aqueous medium with a compound selected from the group consisting of 2:5 dimethyl piperazine and its water-soluble salts, heating said aqueous medium in order to preferentially dissolve the 2:5 dimethyl piperazine di-equilin 3-monosulfate present therein, cooling said reaction medium in order that solid 2:5 dimethyl piperazine di-equilin 3-monosulfate may be deposited therein, removing said 2:5 dimethyl piperazine di-equilin 3-monosulfate, and hydrolyzing said compound, thereby securing equilin.

DESMOND BEALL.
GORDON A. GRANT.
PAUL EMILE LEGAULT.

References Cited in the file of this patent

UNITED STATES PATENTS

| Number | Name | Date |
|---|---|---|
| 2,534,121 | Grant | Dec. 12, 1950 |
| 2,597,723 | Grant | May 20, 1952 |